(12) United States Patent
Hagstroem et al.

(10) Patent No.: US 12,472,087 B2
(45) Date of Patent: Nov. 18, 2025

(54) VALVE FOR A UROSTOMY APPLIANCE

(71) Applicant: Coloplast A/S, Humlebaek (DK)

(72) Inventors: Christen Hagstroem, Glostrup (DK); Jakob Bak Jaepelt, Kgs. Lyngby (DK)

(73) Assignee: Coloplast A/S, Humlebaek (DK)

( * ) Notice: Subject to any disclaimer, the term of this patent is extended or adjusted under 35 U.S.C. 154(b) by 322 days.

(21) Appl. No.: 18/267,789

(22) PCT Filed: Dec. 21, 2021

(86) PCT No.: PCT/DK2021/050378
§ 371 (c)(1),
(2) Date: Jun. 16, 2023

(87) PCT Pub. No.: WO2022/135643
PCT Pub. Date: Jun. 30, 2022

(65) Prior Publication Data
US 2024/0058158 A1 Feb. 22, 2024

(30) Foreign Application Priority Data
Dec. 22, 2020 (DK) .......................... PA 2020 70865

(51) Int. Cl.
*A61F 5/44* (2006.01)
*A61F 5/443* (2006.01)
*A61F 5/445* (2006.01)

(52) U.S. Cl.
CPC ............ *A61F 5/4405* (2013.01); *A61F 5/445* (2013.01); *A61F 5/443* (2013.01)

(58) Field of Classification Search
CPC ......... A61F 5/4405; A61F 5/445; A61F 5/443
See application file for complete search history.

(56) References Cited

U.S. PATENT DOCUMENTS 4,238,059 A * 12/1980 Caraway ............... A61F 5/4405
285/332
4,280,498 A * 7/1981 Jensen ................. A61F 5/4405
604/323

(Continued)

FOREIGN PATENT DOCUMENTS

EP 0953322 A2 11/1999
EP 1800632 A1 6/2007

(Continued)

*Primary Examiner* — Guy K Townsend
(74) *Attorney, Agent, or Firm* — Coloplast Corp., Coloplast A/S; Nick Baumann

(57) ABSTRACT

A valve (10) for draining fluid from a urostomy pouch (5), where the valve (10) comprises a first valve portion (20) comprising a head portion (24), an inlet (15), a stem (6), a first bore (22), at least one outlet opening (23) and a distal end closure (15), a second valve portion (30) comprising a sleeve (7), a second bore (32) and a valve outlet (33), wherein the stem (6) and the sleeve (7) are threadedly engaged by a threaded connection (26), the first bore (22) and the second bore (32) form a channel to transport fluid from the inlet (15) to the valve outlet (33), the sleeve (7) encircles the stem (6) and is adapted to close off the channel to prevent drainage of fluid, the distal end closure (25) of the first valve portion (20) is adapted to close off the valve outlet (33) of the second valve portion (30), the threaded connection (26) between the stem (6) and the sleeve (7) is adapted for displacing the sleeve (7) away from the head portion (24) of the first valve portion (20) to open the channel and allow drainage of fluid through the valve (10), as the distal end closure (25) is displaced simultaneously into the second bore (32).

14 Claims, 5 Drawing Sheets

(56) References Cited

U.S. PATENT DOCUMENTS

| | | | | |
|---|---|---|---|---|
| 4,573,983 A * | 3/1986 | Annis | ............... | A61F 5/441 |
| | | | | 600/580 |
| 4,603,837 A * | 8/1986 | Steer | ............... | A61F 5/4405 |
| | | | | 251/352 |
| D300,361 S * | 3/1989 | Tokarz | ............... | D24/129 |
| 4,846,816 A | 7/1989 | Manfredi | | |
| 4,909,478 A * | 3/1990 | Steer | ............... | F16K 5/0414 |
| | | | | 604/323 |
| 5,299,777 A * | 4/1994 | Milstead | ............... | F01M 11/0408 |
| | | | | 251/291 |
| 6,132,408 A * | 10/2000 | Lutz | ............... | A61F 5/4407 |
| | | | | 604/335 |
| 6,156,025 A * | 12/2000 | Niedospial, Jr. | ............... | A61M 5/16877 |
| | | | | 604/905 |
| 6,913,244 B1 * | 7/2005 | Atkinson | ............... | F16K 1/123 |
| | | | | 251/343 |
| 7,008,407 B1 * | 3/2006 | Kamp | ............... | A61F 5/4405 |
| | | | | 604/327 |
| 8,088,114 B1 | 1/2012 | Pauze | | |
| 8,882,732 B2 * | 11/2014 | March | ............... | A61F 5/445 |
| | | | | 604/332 |
| 9,333,110 B2 * | 5/2016 | March | ............... | A61F 5/445 |
| 10,251,770 B2 * | 4/2019 | Chang | ............... | A61F 5/445 |
| D978,345 S * | 2/2023 | Green | ............... | D24/129 |
| 11,701,249 B2 * | 7/2023 | Green | ............... | A61F 5/445 |
| | | | | 604/335 |
| 2011/0106060 A1 * | 5/2011 | Atkinson | ............... | F16K 27/041 |
| | | | | 251/324 |
| 2012/0130329 A1 * | 5/2012 | March | ............... | F16K 3/24 |
| | | | | 604/332 |
| 2013/0338616 A1 * | 12/2013 | Galindo | ............... | A61F 5/4405 |
| | | | | 604/335 |
| 2015/0025483 A1 * | 1/2015 | March | ............... | A61F 5/4405 |
| | | | | 604/318 |
| 2015/0190272 A1 * | 7/2015 | Chang | ............... | A61F 5/445 |
| | | | | 604/335 |
| 2017/0156919 A1 * | 6/2017 | Jepsen | ............... | A61F 5/4405 |
| 2021/0022911 A1 * | 1/2021 | Scalise | ............... | A61F 5/4407 |
| 2021/0251795 A1 * | 8/2021 | Holroyd | ............... | A61F 5/4405 |
| 2021/0251796 A1 * | 8/2021 | Holroyd | ............... | A61F 5/4405 |
| 2021/0251797 A1 * | 8/2021 | Holroyd | ............... | A61F 5/445 |
| 2021/0259874 A1 * | 8/2021 | Oellgaard | ............... | A61F 5/44 |
| 2023/0138034 A1 * | 5/2023 | Green | ............... | A61F 5/4404 |
| | | | | 604/335 |
| 2023/0270581 A1 * | 8/2023 | Green | ............... | A61F 5/4405 |
| | | | | 604/323 |
| 2024/0058158 A1 * | 2/2024 | Hagstroem | ............... | A61F 5/4405 |

FOREIGN PATENT DOCUMENTS

| | | |
|---|---|---|
| WO | 2010123382 A1 | 10/2010 |
| WO | 2016008493 A1 | 1/2016 |
| WO | 2020128456 A1 | 6/2020 |
| WO | 2020128457 A1 | 6/2020 |
| WO | 2020174218 A1 | 9/2020 |

* cited by examiner

VALVE FOR A UROSTOMY APPLIANCE

The invention relates to a valve for a urostomy appliance.

BRIEF DESCRIPTION OF THE DRAWING

The accompanying drawings are included to provide a further understanding of embodiments and are incorporated into and a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
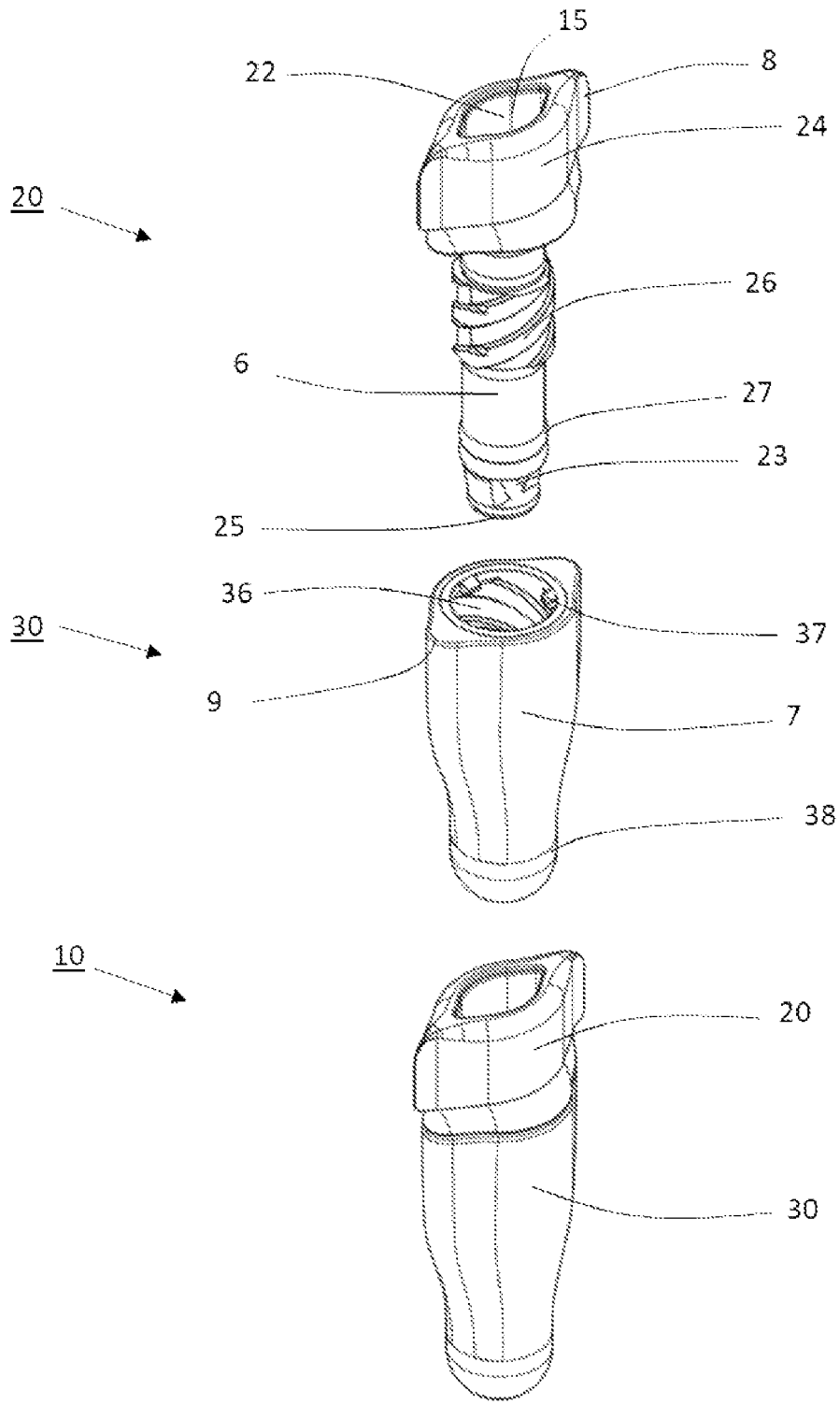
FIG. 1 illustrates in a perspective view a valve for a urostomy appliance.

Embodiments, and features of the various exemplary embodiments described in this application, may be combined with each other ("mixed and matched"), unless specifically noted otherwise.

A urostomy appliance is typically used to collect urine from a urostomy connecting the urine system in the body with the abdominal surface of the user. The appliance is directly or indirectly adhered to the skin of the user around the urostomy. Urostomy appliances includes a collecting pouch for collecting the urine. The pouch is typically provided with an outlet including a valve at the bottom of it making it possible for the user to drain the urine into a suitable place during the day—e.g. a toilet. At night, a tube for a collecting bag may be connected to the valve.

However, there is still a need for a more convenient solution for the user.

Embodiments relate to a valve for draining fluid from a urostomy pouch, wherein the valve comprises a first valve portion comprising a head portion, an inlet, a stem, a first bore, at least one outlet opening and a distal end closure, a second valve portion comprising a sleeve, a second bore and a valve outlet, wherein the stem and the sleeve are threadedly engaged by a threaded connection, wherein the first bore and the second bore forming a channel to transport fluid from the inlet to the valve outlet, wherein the sleeve encircles the stem and is adapted to close off the channel to prevent drainage of fluid, wherein the distal end closure of the first valve portion is adapted to close off the valve outlet of the second valve portion, and wherein the threaded connection between the stem and the sleeve is adapted for displacing the sleeve away from the head portion of the first valve portion to open the channel and allow drainage of fluid through the valve, as the distal end closure is displaced simultaneously into the second bore.

A valve as described above provides a valve that in a simple manner allows a user to open and close the valve by rotation and thereby be able to drain their urostomy pouch. The user simply rotates the sleeve relative to the head portion as to open the valve. It is convenient to some users that there is no need for repositioning of the hands during handling of the valve. The valve is easy to use. The user is in control of the flow rate and the fluid flowing through the valve. Additionally, the valve operates so as to avoid any undesirable dripping or spillage.

Whenever referring to the proximal end of the valve, the referral is to the end closest to the urostomy collecting pouch. Likewise, whenever referring to the distal end of the valve, the referral is to the end furthest away from the collecting pouch.

The axial direction and the longitudinal direction of the valve extends from the inlet of the valve to the valve outlet. Radial direction is transverse the axial direction.

A collecting pouch urostomy appliance usually comprises a front wall on the distal side and a rear wall on the proximal side. The walls are made of gas and fluid impermeable foil material (for example of polyethylene (PE), polyvinyl-chloride (PVC) or ethylene-vinyl-acetate (EVA)) that is welded around the edges or the rim so as to form a pouch defining a collection chamber. The pouch includes a valve for leading out urine at the bottom of the pouch. The inlet opening is provided in the rear wall and placed in the upper part of the collecting pouch so that when a user stands up, the inlet opening will be above the midline of the collecting pouch. This leaves a larger collecting volume below the inlet opening. Thus, the top of the collecting pouch is defined as the part closest to the inlet opening, and the bottom is defined as the opposite part. Urostomy pouches are typically provided with an outlet at the bottom of the pouch that in its simplest form is an outlet closed by a detachable closure.

The parts of the valve may be made of e.g. a polyolefin material such as polyethylene. The sealing means may be made of LDPE.

Generally, the valve may be a urostomy valve, such as a urostomy pouch valve.

In embodiments, the threaded connection is adapted to coaxially rotate the sleeve relative to the stem displacing the sleeve relative to the head portion in longitudinal direction.

In embodiments, the threaded connection comprises a pitch of 8-22 mm per revolution, such as 15 mm per revolution, thus a pitch of 15 mm by a revolution of 360 degrees. Hereby a displacement of 5 mm per 120 degrees is obtained, which is convenient for some users. The angle of 120 degrees may be ergonomically convenient as the hands of a user do not need to be repositioned during the rotation and opening of the valve. Moreover, a revolution of 90 degrees may for some users feel as not enough rotation, whereas the valve portions align similar to a closed position, when rotated 180 degrees, therefore some users may prefer a revolution between 90 and 180 degrees.

In embodiments, the threaded connection comprises three or four helix-shaped ridges and grooves. The three or four ridges and grooves are arranged on the outer surface of the stem and on the inner surface of the sleeve to provide the threaded connection. Hereby, a stable and sturdy rotatable valve structure is achieved.

In embodiments, the threaded connection is arranged on the stem adjacent to the head portion.

In an embodiment, the distal end closure of the first valve comprises a cylindrically shape forming a stem plug for the circular shaped outlet. The sleeve may be made of resilient material to form a seal around the stem plug.

The valve may be in closed configuration on rotation of the first and second valve portion up to 24 degrees. The threaded connection may have a pitch of approximately 15 mm per revolution. Thus, the length of the stem plug may substantially correspond to the linear displacement between the two valve portions performed by a rotation of 24 degrees. It is convenient for some users that the rotation of the valve portions is initiated before the valve is opened and fluid starts flowing through the valve. It allows the user to initiate the opening of the valve by slowly rotating the sleeve and to feel in control of the valve before fluid starts flowing through the valve, hence, the user is in full control of handling the valve and the flow rate.

In embodiments, the cylindrically shaped distal end closure has a length in longitudinal direction allowing a rotation of up to 30 degrees, such as up to 24 degrees, before the distal end closure is retracted from the valve outlet and the valve is opened. In other words, in the first closed configuration, a rotation of up to 30 degrees, such as up to 24 degrees, is possible without the valve being opened.

The valve may comprise a tactile response when fully open. The valve may comprise a tactile response when closed.

In embodiments, the threaded connection is adapted to perform a maximum displacement in longitudinal direction between the head portion and the sleeve of 4-7 mm by a rotation of 110-130 degrees. The maximum displacement may be 5 mm by a rotation of 110-130 degrees, such as 120 degrees. Hereby is achieved a valve that may be easy to use and convenient to handle for most users. A user may not need to reposition the hands on the valve portions during opening of the valve. Visually, the head portion may not be aligned with the sleeve.

Generally, the valve is adapted to have three configurations; a first closed configuration where the distal end closure closes off the valve outlet and the valve is continuously closed as the first valve portion is displaced relative to the second valve portion; a second configuration where the flow of fluid through the channel of the valve increases continuously as the first valve portion is displaced relative to the second valve portion, and a third opened configuration where the valve is fully open allowing max flow of fluid through the flow path.

In embodiments, the second valve portion comprises a decreasing cross-sectional area towards the valve outlet at the distal end, the cross-sectional area of the valve outlet is smaller than the distal part of the inner bore. The valve outlet may comprise a circular cross-sectional shape. The sleeve may be made of resilient material so as to provide a tightly closed outlet as the distal end closure may be pressed into closed position.

In embodiments, the at least one outlet opening of the first valve portion is arranged at the distal end of the stem. The at least one outlet opening may be oriented radially or axially allowing fluid to flow from the first bore into the second bore.

In embodiments, the sleeve comprises a proximal portion comprising the threaded connection and a distal portion without the threaded portion. The sleeve encircles the stem; thus, the threaded connection is arranged on the outer surface of the stem and on the inner surface of the sleeve.

In embodiments, the first valve portion comprises one or more ring-shaped seals arranged proximal the at least one outlet opening. The stem may comprise one or more ring-shaped seals for fluidly seal between the stem and the sleeve.

Additionally, embodiments comprise one or more ring-shaped seals positioned adjacent to the at least one outlet opening on the distal end of the first valve portion.

In embodiments, the second valve portion comprises a ring-shaped sealing groove on the outer surface for connection with a urostomy appliance. A tube for a night collecting bag may be connected to the valve by the sealing groove.

In embodiments, the valve comprises in closed configuration a total length from the inlet to the valve outlet of 30-55 mm, such as 38-47 mm. It may be a convenient valve size for most users, as the valve is relatively small, but still big enough to handle.

In embodiments, the second valve portion comprises a shape having a size in cross-sectional direction of 8-25 mm, such as 14-19 mm.

Generally, embodiments relate to a valve for draining fluid from a urostomy pouch, wherein the valve comprises a first valve portion comprising a head portion, an inlet, a stem, a first bore, at least one outlet opening and a distal end closure, a second valve portion comprising a sleeve, a second bore and a valve outlet, wherein the stem and the sleeve are threadedly engaged by a threaded connection, the first bore and the second bore forming a channel to transport fluid from the inlet to the valve outlet, the sleeve encircles the stem and is adapted to close off the channel to prevent drainage of fluid, the distal end closure of the first valve portion is adapted to close off the valve outlet of the second valve portion; the threaded connection between the first valve portion and the second valve portion is adapted for displacing the first valve portion relative to the second valve portion in a longitudinal direction by rotation, in such a way that when the valve is in a closed configuration, the distal end closure of the first valve portion closes off the valve outlet of the second valve portion, and further such that when the valve is in an opened configuration, the distal end closure is retracted into the second bore by rotation of the first valve portion relative to the second valve portion, wherein the valve is fully opened by a rotation of 95-145 degrees, such as 100-140 degrees, such as 110-130 degrees, such as 120 degrees.

A valve as described above provides a valve that in a simple manner allows a user to open and close the valve by rotation and thereby be able to drain their urostomy pouch. It is convenient to some users, that there is no need for repositioning of the hands during handling of the valve. The valve is easy to use, and the user is in control of the flow rate and fluid flowing through the valve. Additionally, the valve operates so as to avoid any undesirable dripping or spillage. An angle of 120 degrees may be an ergonomically preferred angle for some users.

In embodiments, the threaded connection is adapted to perform a displacement by rotation in longitudinal direction of the first valve portion relative to the second valve portion of maximum 4-7 mm, such as 5-6 mm, such as 5 mm.

The means for attaching the urostomy appliance to the user may include a base plate for attaching to the skin of the user and a wafer on the urostomy appliance for coupling the appliance to the base plate. Alternatively, the appliance may include a wafer that is adapted for directly adhering it to the skin of the user.

DETAILED DESCRIPTION OF THE DRAWING

In the following detailed description, reference is made to the accompanying drawings, which form a part hereof, and in which is shown by way of illustration specific embodiments in which the invention may be practiced. Because components of embodiments can be positioned in different orientations, the directional terminology is used for purposes of illustration and is in no way limiting. It is to be understood that other embodiments may be utilized, and structural or logical changes may be made without departing from the scope of the present invention.

Therefore, the following detailed description is not to be taken in a limiting sense, and the scope of the present invention is defined by the appended claims.

FIG. 1 illustrates, in perspective view, a valve 10 for a urostomy appliance. The valve 10 comprises a first and a second valve portion 20,30.

The first valve portion 20 comprises a head portion 24 and an inlet 15 at the proximal end and a stem 6 and two radial facing outlet openings 23 and a distal end closure 25 at the distal end. A first elongated bore 22 connects the inlet 15 and the two outlet openings 23. The outer surface of the head portion 24 provides a first grip portion 8.

The second valve portion 30 comprises a sleeve 7, a second elongated bore 32 and a valve outlet 33. The outer surface of the sleeve provides a second grip portion 9.

The stem 6 and the sleeve 7 are threadedly engaged by a threaded connection 26,36. The threaded connection 26,36 has ridges with matching grooves, respectively on part of the outside surface of the stem 6 and on part of the inner face of the elongated bore of the second valve portion 30. The valve 10 is formed by the two valve portions 20,30 when screwed together. The threaded connection 26,36 comprises a stop flange 37. The stop flange 37 is a safety against separation of the first and second valve portions and further provides a tactile response to the user during use.

The stem 6 of the first valve portion 20 comprises two ring-shaped sealings 27 arranged proximal adjacent to the outlet openings 23.

The second valve portion 30 comprises a ring-shaped sealing groove 38 on the outer surface for connection with accessories for a urostomy appliance, such as a tube for a night collecting bag.

Figure 2:
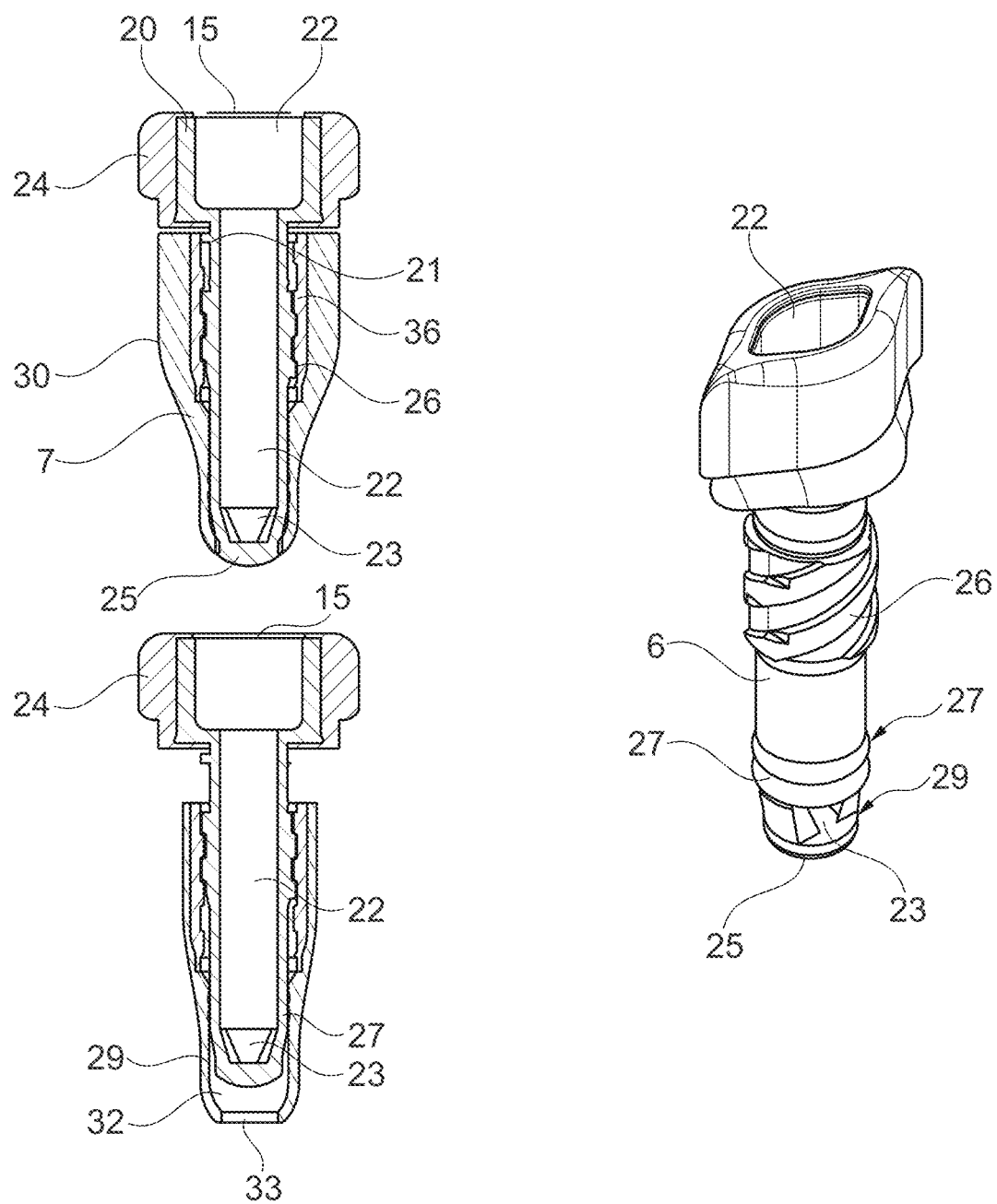
FIG. 2 illustrates a detailed cross-sectional view of a valve in a closed and an opened configuration and a perspective view of the first valve portion of the valve.

FIG. 2 illustrates a detailed cross-sectional view of the valve 10 in a closed and an opened configuration.

In the closed configuration, the distal end closure 25 of the first valve portion 20 closes off the valve outlet 33.

The outer surface of the head portion 24 and the sleeve 7 comprises a ridge extending along the valve 10 in longitudinal direction forming a first grip portion 8 and a second grip portion 94. A user may grip the head portion 24 and the sleeve along the grip portions and rotate the sleeve coaxially in relation to the stem such that the distance between the head portion 24 and the sleeve 7 increases. In closed configuration, there is a distance between the head portion 24 and the sleeve 7 of 0.5 mm. After a rotation of approximately 120 degrees, the distance between the head portion and the sleeve has increased to 5.5 mm in opened configuration. A maximum rotation of 120 degrees is ergonomically preferred for some users.

In the opened configuration the distal end closure 25 is positioned inside the second bore retracted from the valve outlet 33. The displacement of the distal end closure in relation to the valve outlet 33 is done by rotation of the sleeve relative to the stem and head portion.

The first bore 22 and the second bore 32 forms a channel to transport fluid from the inlet 15 to the valve outlet 33. The sleeve 7 encircles the stem 6 and is adapted to close the channel to prevent drainage of fluid through the valve 10.

The threaded connection 26,36 between the stem 6 and the sleeve 7 is adapted to displace the sleeve 7 relative to the head portion 24. The displacement performed by rotation displaces the sleeve 7 relative to the head portion 24 in longitudinal direction.

From a closed to an open configuration of the valve, a movement of the sleeve 7 by rotation displaces the sleeve 7 away from the head portion 24, as the distal end closure 25 is simultaneously moved into the second bore 32. Hereby, the valve outlet is opened and the valve allows drainage of fluid through the channel.

In the opened configuration, fluid may flow through the channel providing a flow path from inlet to valve outlet. The channel fluidly connecting the inlet 15 to the valve outlet 33. The channel is formed from the inlet via the first elongated bore 22, the two outlet openings 23, the second elongated bore 32 to the valve outlet 33 thus allowing fluid to flow all the way through the valve 10.

In closed configuration, the distal end closure 25 of the first valve portion 20 closes off the outlet 33 of the second valve portion 30. In opened configuration, the distal end closure 25 is positioned in the second bore 32.

The threaded connection 26,36 has a pitch of 15 mm per revolution, thus the axial movement of the threaded connection in one revolution is 15 mm. The valve is fully opened by a rotation of 120 degrees which corresponds to a displacement of approximately 5.0 mm. Thus, in other words, the displacement of the sleeve away from the head portion is 15 mm per revolution, or 5 mm per 120 degrees.

In the closed configuration, the distance between the head portion 24 and the proximal end of the sleeve is 0.5 mm. After a rotation of 120 degrees, the distance between the head portion 24 and the sleeve 7 is increased by 5 mm to 5.5 mm.

Additionally, FIG. 2 shows a perspective view of the first valve portion 20. The threaded connection 26,36 having three or four helix-shaped ridges and grooves formed on the outer surface of the first valve portion 20 and on the inner face of the second valve portion 30.

The distal end closure 25 of the first valve portion 20 is adapted to close off the valve outlet 33 of the second valve portion 30. The distal end closure 25 of the first valve comprises a cylindrically shape forming a stem plug 29 for the valve outlet 33. The distal end closure 25 comprises a cylindrically shaped extending in longitudinal direction closing of the valve outlet 33.

Figure 3:
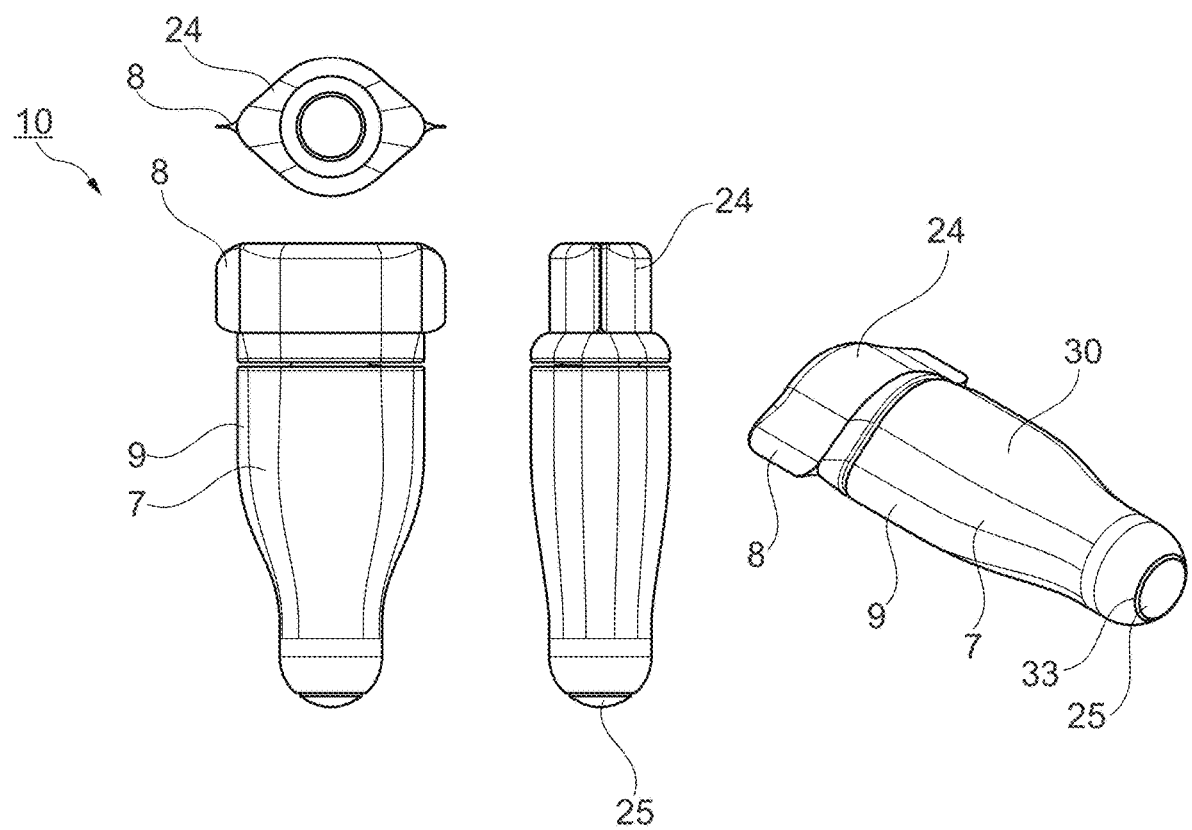
FIG. 3 illustrates a top view, two side views and a perspective view of a valve in a closed configuration.

FIG. 3 illustrates a top view, two side views and a perspective view of a valve in a closed configuration. The top view of the valve illustrates that the valve comprises a cross-section shaped like a diamond-shape. In the illustrated example, the dimension across the diamond in one direction is 14 mm and in another direction 19 mm. The second valve portion 30 has, in the illustrated example, a total length of 47 mm in longitudinal direction.

Figure 4:
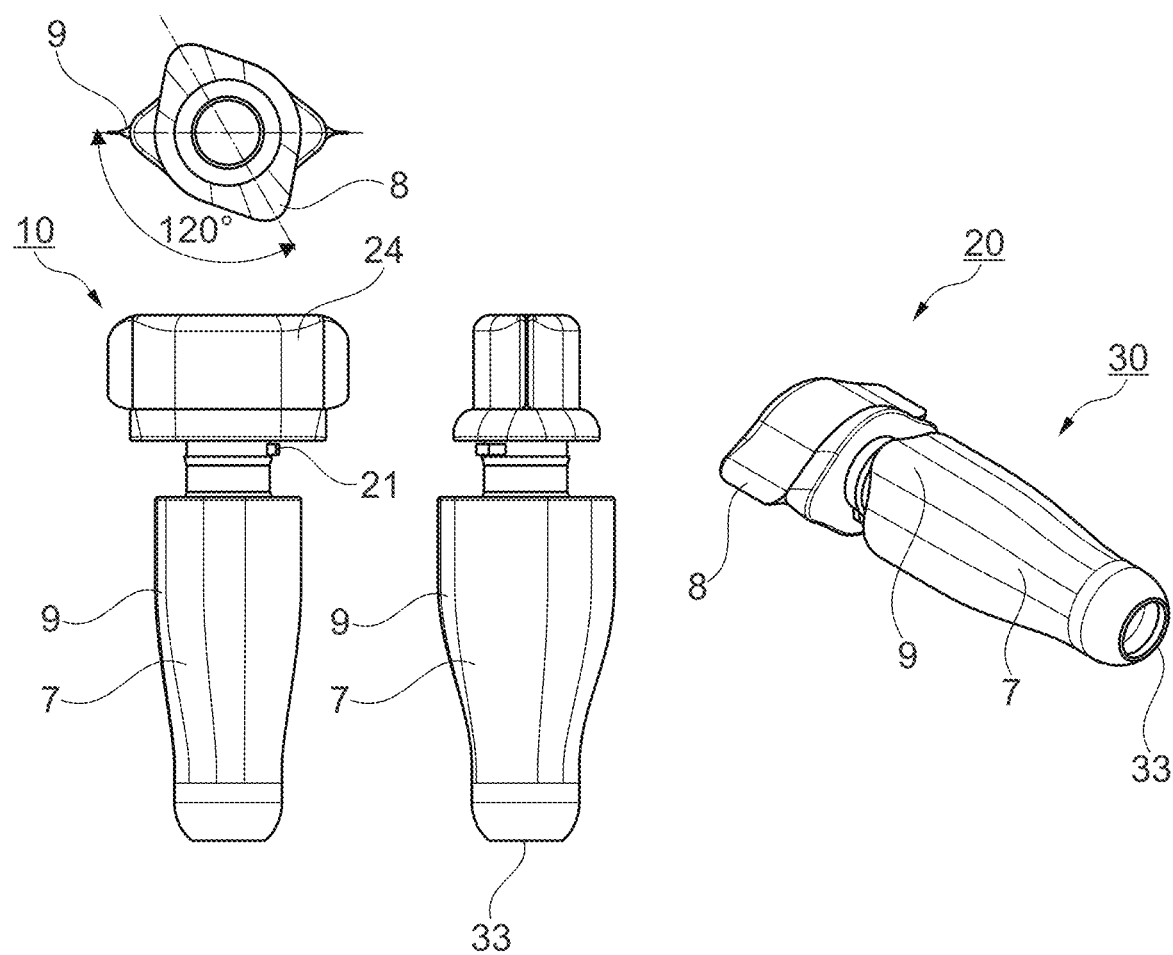
FIG. 4 illustrates a top view, two side views and a perspective view of a valve in an opened configuration.

FIG. 4 illustrates the valve as illustrated in FIG. 3 in an opened configuration. The distance between the head portion 24 and the sleeve 7 is 5.5 mm after a rotation of 120 degrees between the first and second valve portion 20,30. The first valve portion 20 is rotated 120 degrees with respect to the second valve portion 30 and the sleeve is displaced in longitudinal direction in relation to the head portion by 5 mm. The distance in open configuration by 120 degrees is 5.5 mm. The grip portion 8 of the head portion 24 is not aligned with the grip portion 9 of the sleeve 7, thus it is visual for a user that the valve is open.

A minor proximal stop 21 is provided at the proximal end of the stem.

Figure 5:
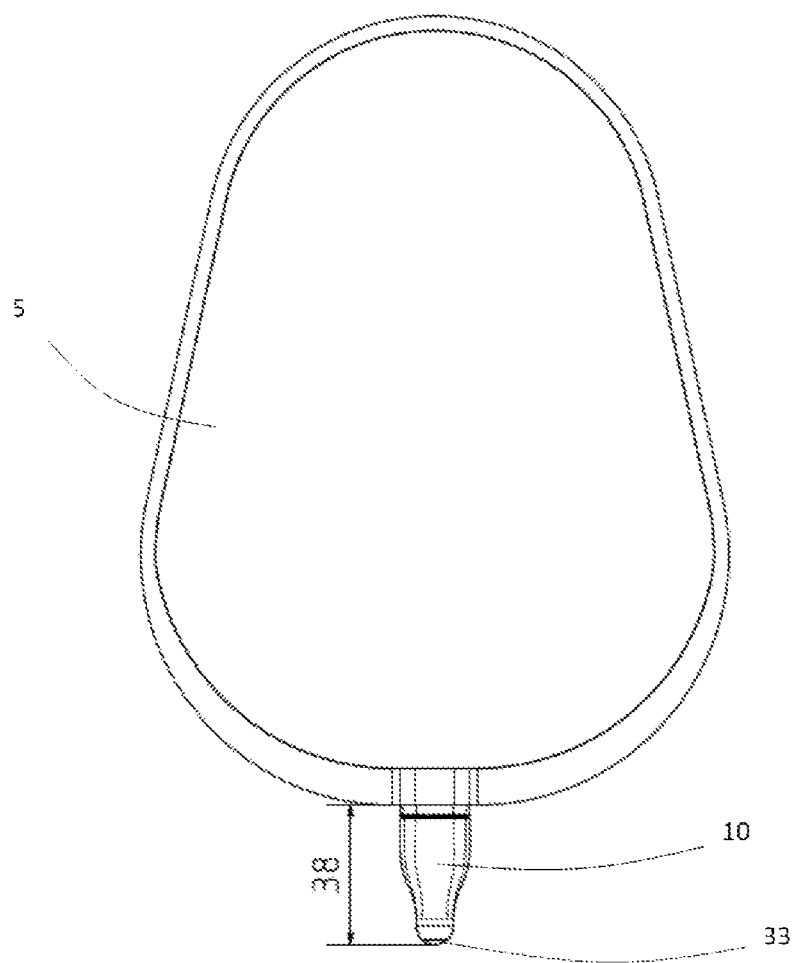
FIG. 5 illustrates a front view of a urostomy collecting pouch and a valve.

FIG. 5 illustrates a urostomy collecting pouch 5 and a valve 10 having a total length of 38 mm in longitudinal direction.

The invention claimed is:

1. A valve for draining fluid from a urostomy pouch, wherein the valve comprises
   a first valve portion comprising a head portion, an inlet formed in the head portion, a stem extending distal of the head portion, a first bore formed in the stem, at least one outlet opening and a distal end closure,
   a second valve portion comprising a sleeve, a second bore and a valve outlet,
   wherein the stem and the sleeve engaged by a threaded connection,
   wherein the first bore and the second bore form a channel to transport fluid from the inlet in the first valve portion to the valve outlet in the second valve portion,
   wherein the sleeve encircles the stem and is adapted to close off the channel to prevent drainage of fluid,
   wherein the distal end closure of the first valve portion is adapted to close off the valve outlet of the second valve portion,
   and wherein the threaded connection between the stem and the sleeve is adapted for displacing the sleeve in a distal direction away from the head portion of the first valve portion to open the channel and allow drainage of fluid through the valve.

2. The valve according to claim 1, wherein the threaded connection is adapted to coaxially rotate the sleeve relative to the stem displacing the sleeve relative to the head portion in a longitudinal direction.

3. The valve according to claim 1, wherein the threaded connection comprises a pitch in a range from of 8-22 mm per revolution.

4. The valve according to claim 1, wherein the threaded connection comprises three helix-shaped ridges and grooves.

5. The valve according to claim 1, wherein the distal end closure of the first valve portion comprises a cylindrically-shaped stem plug sized to mate with a circular-shaped valve outlet.

6. The valve according to claim 5, wherein the cylindrically-shaped distal end closure is configured to retract from the valve outlet of the second valve portion when the stem is rotated by about 24 degrees relative to the sleeve.

7. The valve according to claim 1, wherein the threaded connection is adapted to separate the head portion away from the sleeve in a range from −4-7 mm by a rotation of the n relative to the sleeve in a range from 110-130 degrees.

8. The valve according to claim 1, wherein the second valve portion comprises a decreasing cross-sectional area towards the valve outlet at a distal end of the second valve portion, where the cross-sectional area of the valve outlet is smaller than the second bore.

9. The valve according to claim 1, wherein the at least one outlet opening of the first valve portion is located at a distal end of the stem.

10. The valve according to claim 1, wherein the threaded connection is arranged on a proximal portion of the stem and adjacent to the head portion.

11. The valve according to claim 1, wherein the stem comprises one or more seals for fluidly sealing between the stem and the sleeve.

12. The valve according to claim 1, wherein the second valve portion comprises a sealing groove on an outer surface for connection with a urostomy appliance.

13. The valve according to claim 1, wherein the stem of the first valve portion comprises a circular cross-sectional diameter and the head portion comprises an oblong grip portion extending transverse to the stem radially beyond of the circular cross-sectional diameter.

14. The valve according to claim 1, wherein a distal end of the sleeve is circular and a proximal end of the sleeve comprises an oblong grip portion extending transverse to the sleeve radially beyond of the circular distal end of the sleeve.

* * * * *